United States Patent
Proehl (10) Patent No.: US 9,369,185 B2
(45) Date of Patent: Jun. 14, 2016

(54) METHOD AND APPARATUS FOR INDUCTIVE COUPLING UTILIZING AN AMORPHOUS METAL BARRIER

(71) Applicant: STMicroelectronics, Inc., Coppell, TX (US)

(72) Inventor: Gregory Proehl, Woodstock, IL (US)

(73) Assignee: STMICROELECTRONICS, INC., Coppell, TX (US)

(*) Notice: Subject to any disclaimer, the term of this patent is extended or adjusted under 35 U.S.C. 154(b) by 0 days.

(21) Appl. No.: 14/508,008

(22) Filed: Oct. 7, 2014

(65) Prior Publication Data

US 2015/0116090 A1    Apr. 30, 2015

Related U.S. Application Data

(60) Provisional application No. 61/896,158, filed on Oct. 28, 2013.

(51) Int. Cl.
| | |
|---|---|
| *G06K 7/10* | (2006.01) |
| *H04B 5/00* | (2006.01) |
| *H01F 38/14* | (2006.01) |
| *H01F 27/36* | (2006.01) |

(52) U.S. Cl.
CPC .......... *H04B 5/0037* (2013.01); *G06K 7/10297* (2013.01); *H01F 27/362* (2013.01); *H01F 38/14* (2013.01); *H04B 5/0031* (2013.01); *H04B 5/0075* (2013.01)

(58) Field of Classification Search
CPC .......... H04B 5/0037; H04B 5/00; G06K 7/10; G06K 7/10297; H01F 38/14
USPC ............... 340/10.1, 572.1, 8.1, 10.6, 5.74; 235/492, 375; 348/143; 333/219; 264/272.2

See application file for complete search history.

(56) References Cited

U.S. PATENT DOCUMENTS

| | | | |
|---|---|---|---|
| 2008/0136571 A1* | 6/2008 | Peter | G08B 13/2408 335/306 |
| 2009/0195386 A1* | 8/2009 | Peter | G08B 13/2408 340/572.1 |
| 2012/0057322 A1* | 3/2012 | Waffenschmidt | H01F 27/365 361/816 |
| 2014/0265612 A1* | 9/2014 | Choi | H01F 27/2804 307/104 |
| 2014/0266030 A1* | 9/2014 | Park | H01F 27/34 320/108 |
| 2015/0055009 A1* | 2/2015 | Choi | H04N 5/2257 348/335 |
| 2015/0236401 A1* | 8/2015 | Yamaguchi | H01Q 1/243 343/702 |
| 2015/0280322 A1* | 10/2015 | Saito | H01Q 7/06 343/788 |
| 2015/0288054 A1* | 10/2015 | Orihara | H01Q 1/243 343/702 |

\* cited by examiner

*Primary Examiner* — Allen T Cao
(74) *Attorney, Agent, or Firm* — Gardere Wynne Sewell LLP (57) ABSTRACT

A near-field magnetic induction system includes a metallic structure, an amorphous metal barrier and a near-field magnetic induction device. The device includes an antenna coupled to the amorphous metal barrier and a circuit electrically coupled to the antenna. In use, the antenna is separated from the metallic structure by the amorphous metal barrier. The amorphous metal barrier may be integrated with the near-field magnetic induction device or with the metallic structure. Inductive coupling with the near-field magnetic induction device may be used, for example, in communication or energy transfer applications such as RFID tags and inductive chargers.

24 Claims, 5 Drawing Sheets

METHOD AND APPARATUS FOR INDUCTIVE COUPLING UTILIZING AN AMORPHOUS METAL BARRIER

CROSS-REFERENCE TO RELATED APPLICATION

This application claims priority to U.S. Provisional Application for Patent No. 61/896,158 filed Oct. 28, 2013, the disclosure of which is incorporated by reference.

BACKGROUND

Inductively Coupled systems, also known as Near Field Magnetic Induction (NFMI) systems, provide wireless communication or wireless power transmission within a localized magnetic field (the near field) of a transmitter.

The power density of near-field transmissions is highly localized and attenuates or decays off at a rate proportional to the inverse of the range to the sixth power ($1/\text{range}^6$) or −60 dB per decade. In contrast, a radiated electromagnetic field decays at −20 dB per decade ($1/\text{range}^2$). Coupling efficiency and range may be increased by using tuned transmitters and receivers. Inductively Coupled communication systems provide secure wireless communication between a transmitter and receiver. Example applications of Inductively Coupled communication systems include radio frequency identification (RFID), Near-Field Communication (NFC) and wireless charging systems.

One restriction on the use of Inductively Coupled systems is that metallic objects or surfaces affect the inductance of the receiver or transmitter antennas by channeling some or all of the magnetic field flux away from the receiving antenna. One approach to mitigate this problem uses a ferrite shield as a barrier between the antenna and the metallic object. However, the physical construction of a ferrite shield makes it impractical for many applications. For example, a ferrite barrier may be constructed of a ferrite powder in a flexible matrix material. Increasing the ferrite content limits the flexibility of the barrier and makes it brittle, so a minimum thickness of material is required. Ferrite shield materials typically have a thickness of 0.1 mm or more and are not uniform enough to limit the magnetic field interaction or to provide a consistent structure to guide the magnetic flux around the windings of the antennas.

It would be useful to provide an effective barrier between an antenna of an inductively coupled communication system and a metallic object.

SUMMARY

In an embodiment, a near-field magnetic induction system comprises a metallic structure; an amorphous metal barrier; and a near-field magnetic induction device including: an antenna; and a circuit electrically coupled to the antenna, wherein the near-field magnetic induction device is mounted to the amorphous metal barrier and supported by the metallic structure.

In an embodiment, an apparatus comprises: a metallic casing within which is mounted an electronic device operable in response to an external magnetic field; and an amorphous metal barrier located on an exterior surface of the metal casing and configured to reduce energy transfer from said external magnetic field to said metallic casing.

In an embodiment, a near-field magnetic induction system comprises: a metallic structure having a first surface; an amorphous metal barrier having a second surface mounted to the first surface of the metallic structure and having a third surface; and a near-field magnetic induction device mounted to the third surface of the amorphous metal barrier, the near-field magnetic induction device including: an antenna; and a circuit electrically coupled to the antenna.

BRIEF DESCRIPTION OF THE DRAWINGS

Exemplary embodiments of the present disclosure will be described below with reference to the included drawings such that like reference numerals refer to like elements and in which.

DETAILED DESCRIPTION OF THE DRAWINGS

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

Embodiments of the present disclosure relate to a near-field magnetic induction (NFMI) system that may be operated on a metallic structure. An exemplary system includes an amorphous metal barrier, an antenna coupled to the amorphous metal barrier, and a circuit electrically coupled to the antenna. The antenna is separated from the metallic structure by the amorphous metal barrier when the near-field magnetic induction system is coupled to the metallic structure via the amorphous metal barrier. The antenna may be located on a surface of the amorphous metal barrier.

An amorphous or non-crystalline metal is a metal that lacks long-range order in its crystal structure.

The circuit may be responsive to a current induced in the antenna by a magnetic field, to enable incoming communication or energy transfer, for example. Further, the circuit may be operable to modulate a current induced in the antenna by a magnetic field to provide outgoing communication.

In an inductively coupled system, also known as a Near Field Magnetic Induction (NFMI) system, a current in a primary antenna (such as a Radio Frequency Identification (RFID) reader antenna) generates a magnetic flux, which in turn induces a magnetic field. When a secondary antenna (such as an RFID tag antenna) is placed within an oscillating magnetic field, a current is induced in the secondary antenna and may be used for a variety of purposes, such as communication or energy transfer. The presence of the secondary antenna alters the electrical loading on the primary antenna circuit, so the primary and secondary antenna circuits are said to be inductively coupled. Modulation of the electrical loading by the secondary antenna circuit can be sensed by the primary antenna circuit to provide communication. Inductive Coupling is utilized in many applications, such as Radio Frequency Identification (RFID), Near Field Communications (NFC), payment cards, and inductive charging systems. The primary and secondary circuits may be tuned to resonate at approximately the same frequencies to provide efficient energy flow between the circuits. This allows for wireless power supply that may be used for operation of an electronic device or for battery charging.

When a metallic structure is placed within the magnetic field, an electrical eddy current is generated in the object and the resulting power loss prevents operation of the system. This prevents the use of inductively coupled communication or power systems on objects having metal cases—unless steps are taken to reduce the influence of the metal structure. Many portable electronic devices, such as tablet and laptop computers, smart phones, and cameras, for example, have metal cases to minimize thickness and weight, but it is often desirable that these devices also use inductive coupling for communication or power supply. In addition, many other common structures, from automobiles to home appliances, use metal in their construction.

The magnetic flux generated by the primary antenna, induces a magnetic field. As this magnetic field hits the metal structure behind the primary antenna, an electrical current is induced in the metal structure as well as in the secondary antenna. The eddy current in the metal structure can be minimized by increasing the coercivity of the metal structure and breaking apart the crystalline structures that facilitate current flow in the metal structure.

Figure 1:
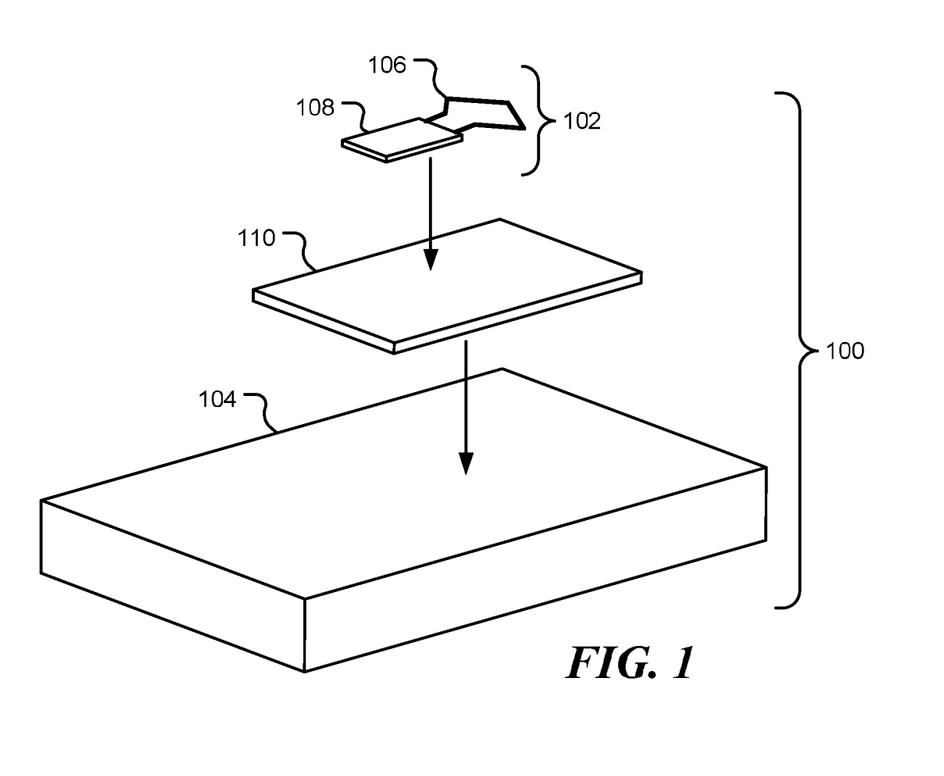
FIG. 1 is a block diagram of a near-field magnetic induction system, in accordance with exemplary embodiments of the present disclosure.

FIG. 1 is an exploded diagrammatic view of a near-field magnetic induction system 100 in accordance with exemplary embodiments of the disclosure. The system enables a near field magnetic induction device 102 to be operated on a metallic structure 104. The near field magnetic induction device 102 comprises an antenna 106 coupled to a circuit 108. The device 102 may be, for example, a Radio Frequency Identification (RFID) Tag, a Near Field Communications (NFC) device, an inductive charging device, or a wireless sensing system. The antenna may be a loop or coil antenna, for example. The device 102 is coupled to the metallic structure 104 via an amorphous metal barrier 110 such that the antenna 106 is separated from the metallic structure 104 by the amorphous metal barrier 110 when the near-field magnetic induction device 102 is coupled to the metallic structure 104 via the amorphous metal barrier 110.

The amorphous metal barrier 110 is constructed of an amorphous metal, also known as a metallic glass or a glassy metal, and acts as a barrier material between the metallic structure 104 and the antenna 106. This reduces the magnetic flux in the metallic structure 104 and thereby reduces energy losses associated with eddy currents produced in the metallic structure. The amorphous metal barrier 110 may be a thin geometric structure. In one exemplary embodiment, the amorphous metal has a thickness of approximately 25 µm or less and so does not add much volume to the system 100. Other thicknesses, including thicknesses greater than 25 µm may be used without departing from the present disclosure.

Amorphous metals are often alloys. The alloys of boron, silicon, phosphorus, and other glass formers, with magnetic metals (iron, cobalt, nickel) have high magnetic susceptibility, with low coercivity and high electrical resistance. Usually the conductivity of a metallic glass is of the same low order of magnitude as of a molten metal just above the melting point.

Eddy currents are created when a conductor experiences changes in the magnetic field. The high resistance of amorphous metals leads to low losses by eddy currents when subjected to alternating magnetic fields. Their low coercivity also contributes to low loss. Consequently, more energy is available for transfer to the near field magnetic induction device.

Amorphous metals may be produced, for example, using a rapid solidification technology where molten metal is cast into thin solid ribbons by cooling at a rate of approximately one million ° C./second. Amorphous metal has high magnetic permeability due to an absence of crystalline magnetic anisotropy.

The amorphous metal barrier does not block the magnetic field, as with electric shielding, but rather draws the field into itself, providing a path for the magnetic field lines around the shielded metal structure. This reduces the magnetic flux, and the associated eddy current losses, in the metal structure.

Amorphous metals are used in power transformers. In that application, the amorphous metal is used in the transformer core that passes through the primary and secondary windings of the transformer. In contrast, in the present disclosure, the primary and second antenna are coupled through an air core.

Amorphous metals are also used in security tags used in electronic article surveillance (EAS) systems.

An example amorphous metal is Metglas magnetic material manufactured by Metglas, Inc., Conway, S.C. This is an amorphous metal alloy ribbon produced using a high-speed casting process. The material has extremely low core loss and high magnetic permeability. Other amorphous metal alloys, such as Liquidmetal® produced by Liquidmetal Technologies, Inc., California, may be used to produce cast or injection molded amorphous metal structures.

Amorphous metals have a structure which has a moderate coercive field. For perspective, materials with high coercivity are permanent magnets and materials with low coercivity are metal alloys which include an Iron powder in its base, such as ferrite powder pressed into structures for inductors, transformers, cores for electromagnets, and ferrite sheets used for magnetic (electromagnetic) shielding. Typically, most electronic equipment uses electromagnetic shielding in order to pass federal regulations for emitted or conducted electronic radiation. This is done with metal cages (screens or metal sheets), metal foams, metallic inks and sprayed small particulate metals and these metal surfaces are connected to ground, or other electrical current sink. This metal shield is a problem for electromagnetically coupled technologies such as RFID. RFID systems use electromagnetic fields in order to transfer data from one part of the system to another. The magnetic flux generated by the primary antenna induces a magnetic field. If this magnetic field hits a metal structure behind the RFID tag antenna, an electrical current is induced in the metal structure. This eddy current can be minimized by increasing the coercivity and breaking apart the crystalline structures that facilitate current flow in metals or ferrometallic materials. This may be achieved by using an amorphous metal. Amorphous metals have a disorganized crystalline structure (disordered atomic structure) that limit electrical current flow and limit the magnetic flux flow. Therefore, an amorphous metal can act as a shield for RFID systems and other NFMI systems when placed on metal surfaces.

Figure 2:
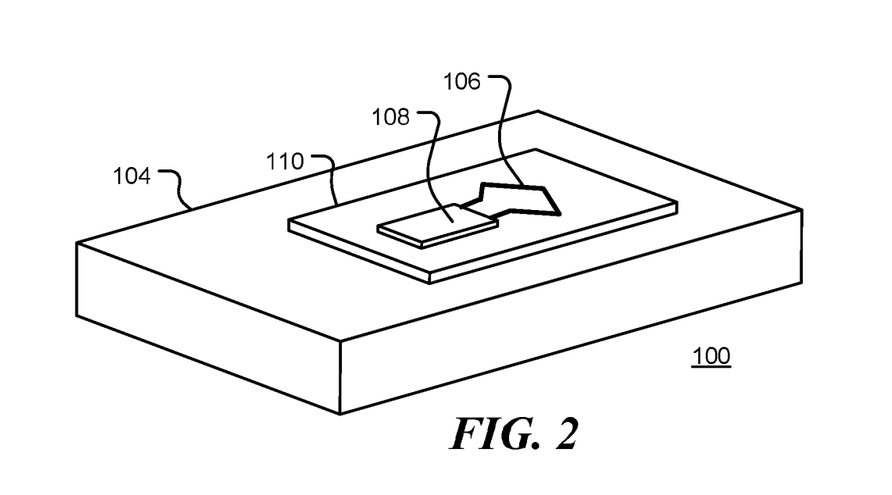
FIG. 2 is a diagrammatic view of an assembled system, in accordance with exemplary embodiments of the present disclosure.

FIG. 2 is a diagrammatic view of an assembled system 100 in accordance with exemplary embodiments of the disclosure. The antenna 106 is located on a surface of the amorphous metal barrier 110. The amorphous metal barrier 110 is located on an external surface of the metallic structure 104.

In one embodiment, the circuit 108 receives power from a current induced in the antenna 106 when the device 102 is located in a magnetic field.

In a further embodiment, the circuit 108 is responsive to a current induced in the antenna 106 when the device 102 is located in a magnetic field.

In a still further embodiment, the circuit 108 is operable to modulate a current induced in the antenna 106 by a magnetic field to enable outgoing communication.

The circuit 108 may be located on the external surface of the amorphous metal barrier 110, as shown, or may be located at a different position, such as in the interior of the metal structure for example.

Figure 3:
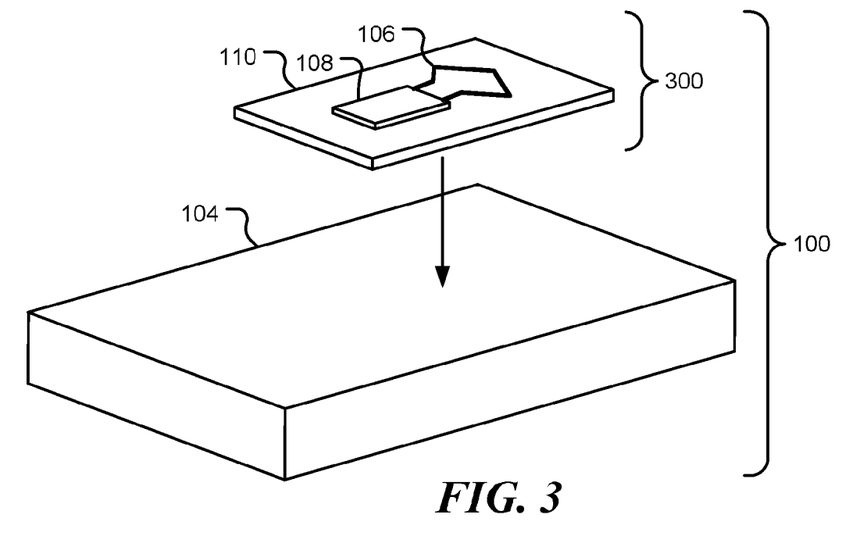
FIG. 3 is a diagrammatic view of a near-field magnetic induction system, in accordance with exemplary embodiments of the present disclosure.

FIG. 3 is a diagrammatic view of a near-field magnetic induction system 100 in accordance with exemplary embodiments of the disclosure. In this embodiment, an antenna 106, a circuit 108 and an amorphous metal barrier 110 are incorporated into a device 300. The device 300 is mountable on a variety of surfaces, such as the surface of metallic structure 104.

Figure 4:
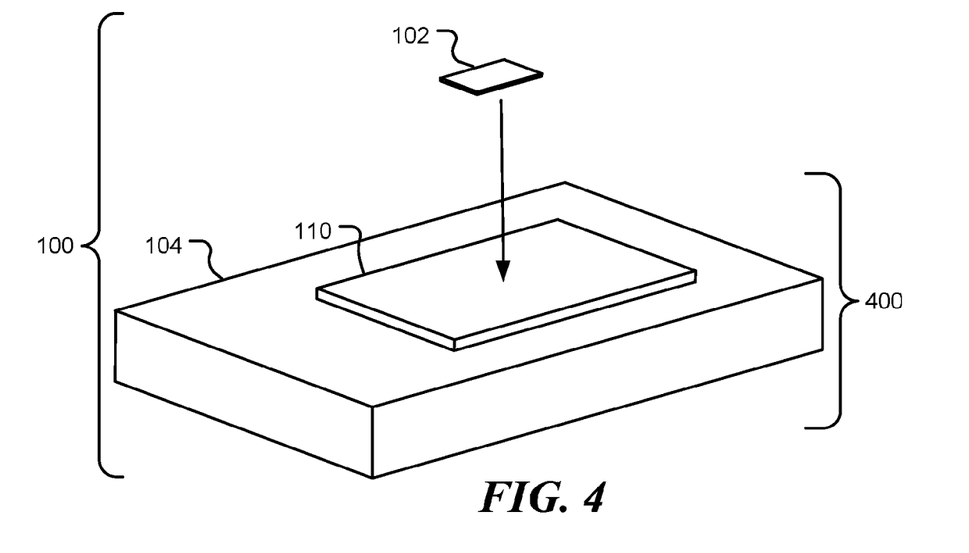
FIG. 4 is a diagrammatic view of a near-field magnetic induction system in accordance with further exemplary embodiments of the present disclosure.

FIG. 4 is a diagrammatic view of a near-field magnetic induction system 100 in accordance with further exemplary embodiments of the disclosure. In this embodiment, an amorphous metal barrier 110 is attached to a metallic structure 104 to form a magnetically protected device 400 onto which a near-field magnetic induction device 102 may be mounted. The magnetically protected device 400 maybe, for example, a portable electronic device, a home appliance or any other device having a metallic casing.

Figure 5:
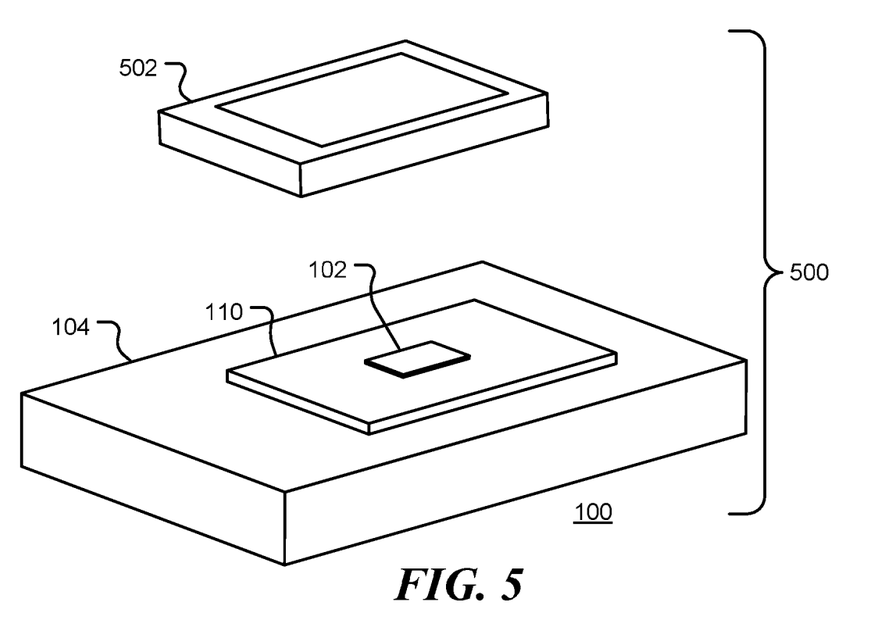
FIG. 5 is a diagrammatic view of an inductively coupled system in accordance with further exemplary embodiments of the present disclosure.

FIG. 5 is a diagrammatic view of an inductively coupled system 500 in accordance with further exemplary embodiments of the disclosure. The inductively coupled system 500 includes a metallic structure 104 (such as a casing), an amorphous metal barrier 110 and a first near-field magnetic induction device 102 coupled to the metallic structure via the amorphous metal barrier 110. In operation, a second near-field magnetic induction device 502 forms an inductive coupling with the first near-field magnetic induction device 102, allowing communication, energy transfer, or both communication and energy transfer between the first and second devices. If the second near-field magnetic induction device 502 has a metallic casing, it too may incorporate an amorphous metal barrier.

In FIG. 5, the amorphous metal barrier 110 has an area greater than or approximately equal to the area of the antenna of the first near-field magnetic induction device 102 and also greater than or approximately equal to the area of the antenna of the second near-field magnetic induction device. In the embodiment shown, the antenna of the second device 502 has a larger area as so determines the size of the barrier 110.

In one embodiment, the metallic structure 104 is a portable electronic device, such as a portable computer, having a metallic casing and the second near-field magnetic induction device 502 is a smartphone. Inductive coupling between the first (102) and second (502) devices enables wireless communication between the portable electronic device and the smartphone and also enables transfer of energy between the devices to allow the smart phone to be inductively charged by simply placing it on the surface of the first device.

Figure 6:
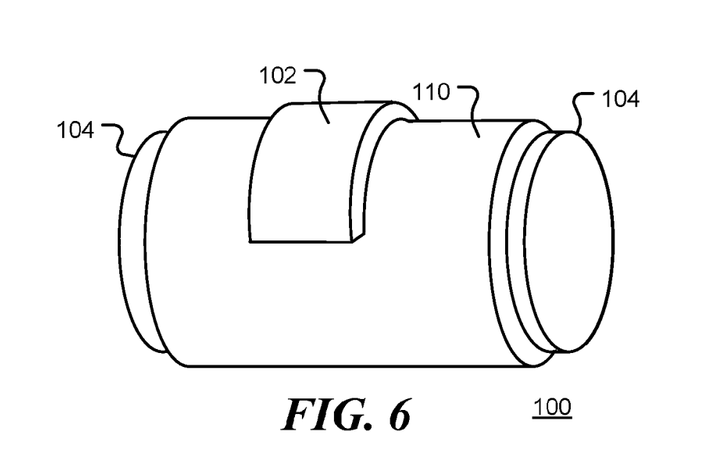
FIG. 6 is a diagrammatic representation of a metallic structure, having an amorphous metal barrier on which is mounted a near-field magnetic induction device, in accordance with exemplary embodiments of the present disclosure.

While shown as having a flat surface, the metallic structure 100 may have any shape. For example, the surface of the metallic structure may be curved, convex, concave, irregular, etc. The amorphous metal barrier 110 may be constructed of a flexible material to facilitate attachment to surfaces having different geometries. An example is shown in FIG. 6. FIG. 6 is a diagrammatic representation of a cylindrical metallic canister 104, having an amorphous metal barrier 110 on which is mounted a near-field magnetic induction device 102. The near-field magnetic induction device 102 may be, for example, an RFID tag that provides information about the canister and its contents. In a further embodiment, the near-field magnetic induction device 102 includes a wireless sensing system that provides information as to the amount or properties of the contents of the canister or a time history of the environment or motion experienced by the canister 104.

In FIG. 6 and the preceding figures, the thickness of the barrier 110 and the device 102 has been exaggerated to aid explanation. However, it is to be understood that the amorphous metal barrier may have a thickness of approximately 25 µm or less. Thicker barriers may also be used, including barriers comprising two or more layers of amorphous metal material.

Figure 7:
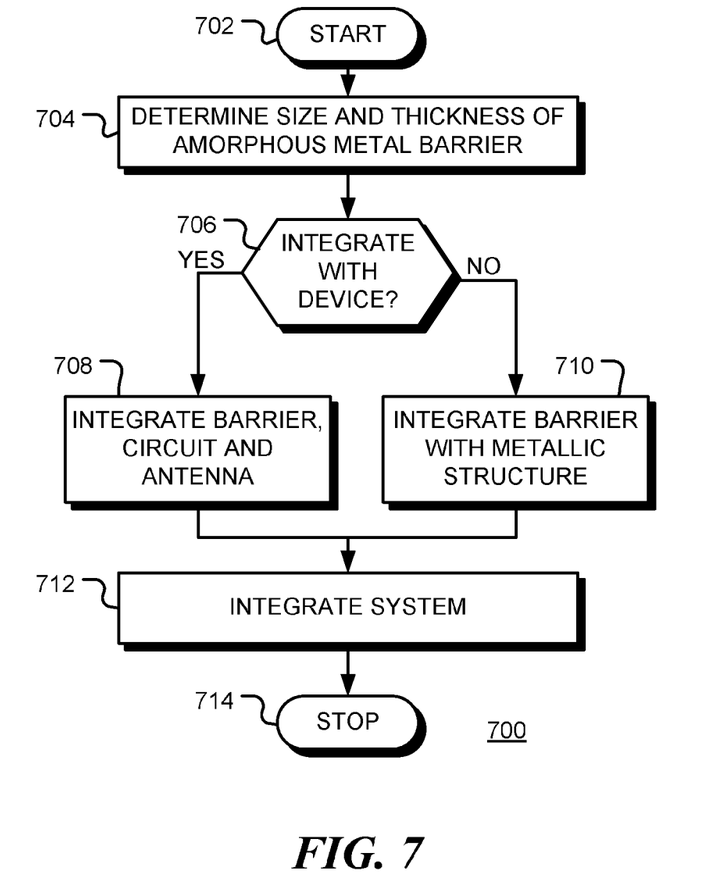
FIG. 7 is a flow chart of a method for enabling inductive coupling with an antenna located in proximity to a metallic structure, in accordance with exemplary embodiments of the present disclosure.

FIG. 7 is a flow chart 700 of a method for enabling inductive coupling with an antenna located in proximity to a metallic structure. The method results in the positioning an amorphous metal barrier between the antenna of a near-field magnetic induction device and the metallic structure. Following start block 702 in FIG. 7, the size and thickness of the amorphous metal barrier are determined at block 704. The area of the barrier may be related to the area of the antenna or to the area of another antenna with which the near-field magnetic induction device is designed to couple. The size and thickness are selected such that energy losses in the metallic structure are sufficiently reduced that inductive coupling is enabled. If the amorphous metal barrier is to be integrated with the near-field magnetic induction device, as depicted by the positive branch from decision block 706, the barrier is integrated with the circuit and antenna of the device at block 708. Otherwise, as depicted by the negative branch from decision block 706, the barrier is integrated with the metallic structure at block 710. Finally, at block 712, the complete system is integrated by mounting the device on the metallic structure such that the barrier is positioned between the device and metallic structure. The method terminates at block 714. The completed system allows the near-field magnetic induction device to couple with an external device for communication or energy transfer, or both.

Figure 8:
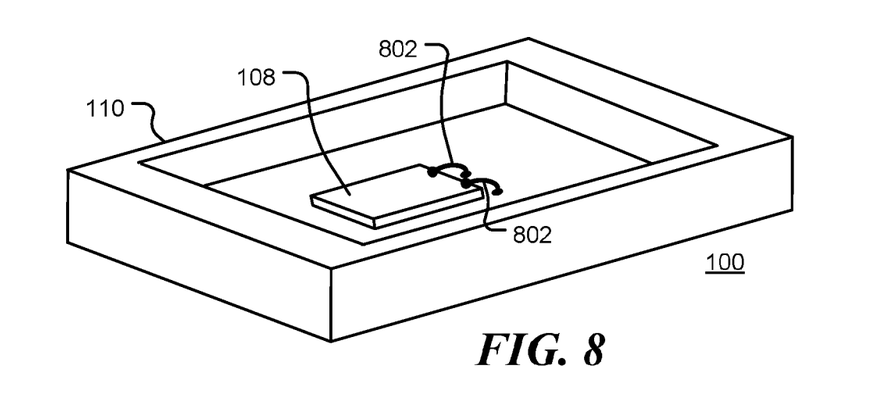
FIG. 8 is a diagrammatic representation of an electronics housing at least a portion of which forms amorphous metal barrier on which is mounted an antenna of a near-field magnetic induction device, in accordance with exemplary embodiments of the present disclosure.

FIG. 8 is a diagrammatic representation of further exemplary system 100, in accordance with exemplary embodiments of the present disclosure. The system 100 includes an electronics housing 110 at least a portion of which forms amorphous metal barrier. The electronics housing 110 contains one or more electronic circuits. A circuit 108 of a near field magnetic induction device is located in the housing. The circuit 108 may be an RFID circuit, for example. The circuit is electrically coupled to an antenna on the underside of the housing 110 via connectors 802 which pass from the interior of the housing 110 to the exterior of the housing. The electronics housing 110 is constructed, at least in part, of an amorphous metal.

Figure 9:
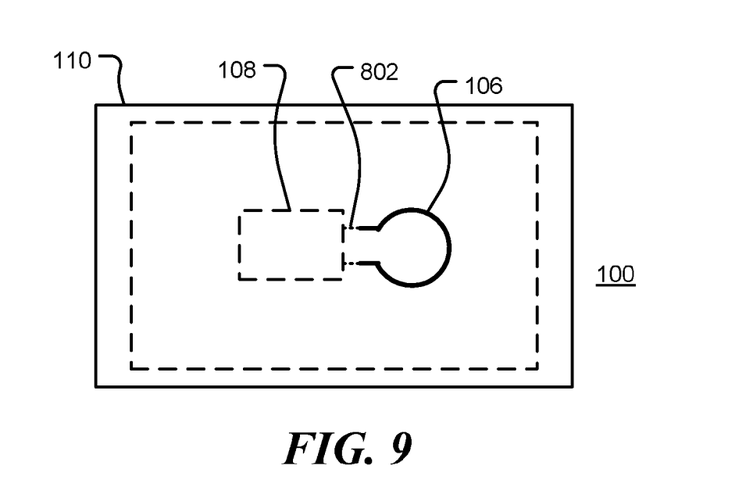
FIG. 9 is a further diagrammatic representation of the electronics housing shown in FIG. 8, in accordance with exemplary embodiments of the present disclosure.

FIG. 9 is a further diagrammatic representation of the system 100 shown in FIG. 8, in accordance with exemplary embodiments of the present disclosure. FIG. 9 is a view of the underside (relative to the view in FIG. 8) of the housing 110. An antenna of a near-field magnetic induction device is located on the exterior of the housing 110. At least the portion of the housing in the housing in the vicinity of the antenna 106 is constructed of an amorphous metal. The remainder of the housing may also be constructed of amorphous metal, or it may be constructed of another material, such as a crystalline metal or a plastic.

The electronics housing 110 may be used for a variety of electronic devices, such as portable electronics (smartphones, portable and tablet computers, etc.). The antenna 106 may be located on any surface of the device. For example, if the near field magnetic induction device is used for battery charging or for electronic payment, the antenna may be located on the underside. If the near field magnetic induction device is used for communicating with other devices, the antenna may be located on the top or a side of the device.

The housing may be manufactured by a variety of methods known to those of ordinary skill in the art, such as casting, injection molding, milling, etc. The size and shape of the housing may be selected according to the desired function. The portion of housing in the vicinity of the antenna acts as a barrier to the magnetic field.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus, comprising:
a metallic casing within which is mounted an electronic device operable in response to an external magnetic field; and
an amorphous metal barrier located on an exterior surface of the metal casing and configured to reduce energy transfer from said external magnetic field to said metallic casing;
wherein the electronic device comprises a near field magnetic induction device attached to the amorphous metal barrier, the near field magnetic induction device having an antenna and an electrical circuit responsive to a current induced in the antenna by the external magnetic field.

2. The apparatus of claim 1, wherein the antenna is coupled to the electrical circuit and mounted to the amorphous metal barrier in a position outside of the metallic casing.

3. The apparatus of claim 2, wherein the electrical circuit is mounted to the amorphous metal barrier in a position inside the metallic casing, and wherein leads for the antenna pass through the amorphous metal barrier.

4. The apparatus of claim 1, wherein the amorphous metal barrier is a part of the metal casing.

5. The apparatus of claim 1, wherein the electronic device comprises a radio frequency identification (RFID) circuit.

6. A near-field magnetic induction system, comprising:
a metallic structure having a first surface;
an amorphous metal barrier having a second surface mounted to the first surface of the metallic structure and having a third surface; and
a near-field magnetic induction device mounted to the third surface of the amorphous metal barrier, the near-field magnetic induction device including:
an antenna; and
a circuit electrically coupled to the antenna.

7. The system of claim 6, wherein the antenna is mounted to the third surface of the amorphous metal barrier.

8. The system of claim 6, wherein the circuit comprises a radio frequency identification (RFID) circuit.

9. The system of claim 6, wherein the antenna is positioned on a surface of the amorphous metal barrier.

10. The system of claim 6, where the circuit is operable to receive power from a current induced in the antenna by a magnetic field.

11. The system of claim 6, where the circuit is responsive to a current induced in the antenna by a magnetic field.

12. The system of claim 6, where the circuit is operable to modulate a current induced in the antenna by a magnetic field.

13. The system of claim 6, wherein the amorphous metal barrier has an area greater than an area of the antenna of the near-field magnetic induction device.

14. The system of claim 6, where the amorphous metal barrier comprises an amorphous metal alloy.

15. A near-field magnetic induction system, comprising:
a metallic structure;
an amorphous metal barrier; and
a near-field magnetic induction device including:
an antenna; and
a circuit electrically coupled to the antenna,
wherein the near-field magnetic induction device is mounted to the amorphous metal barrier and supported by the metallic structure;
wherein the metallic structure is a housing for electronic components;
wherein the amorphous metal barrier comprises at least a portion of the housing; and
wherein the circuit of the near-field magnetic induction device is located inside the housing with the antenna of the near-field magnetic induction device mounted to the amorphous metal barrier.

16. The system of claim 15, where the near-field magnetic induction device comprises a radio frequency identification (RFID) circuit.

17. The system of claim 15, where the amorphous metal barrier comprises an amorphous metal alloy.

18. The system of claim 15, where the antenna is positioned on a surface of the amorphous metal barrier.

19. The system of claim 15, wherein the amorphous metal barrier has an area greater than an area of the antenna of the near-field magnetic induction device.

20. A near-field magnetic induction system, comprising:
a metallic structure;
an amorphous metal barrier; and
a near-field magnetic induction device including:
an antenna; and
a circuit electrically coupled to the antenna, wherein the near-field magnetic induction device is mounted to the amorphous metal barrier and supported by the metallic structure;

wherein the amorphous metal barrier comprises at least a portion of a housing for electronic components; and wherein the circuit of the near-field magnetic induction device is located inside the housing and the antenna of the near-field magnetic induction device mounted to the amorphous metal barrier outside of the housing.

21. The system of claim 20, where the near-field magnetic induction device comprises a radio frequency identification (RFID) circuit.

22. The system of claim 20, where the amorphous metal barrier comprises an amorphous metal alloy.

23. The system of claim 20, where the antenna is positioned on a surface of the amorphous metal barrier.

24. The system of claim 20, wherein the amorphous metal barrier has an area greater than an area of the antenna of the near-field magnetic induction device.

* * * * *